(12) United States Patent
Sorensen

(10) Patent No.: US 7,908,716 B2
(45) Date of Patent: Mar. 22, 2011

(54) TENSIONING DEVICE

(75) Inventor: Joseph Sorensen, Bozeman, MT (US)

(73) Assignee: Nite Ize, Inc., Boulder, CO (US)

( * ) Notice: Subject to any disclaimer, the term of this patent is extended or adjusted under 35 U.S.C. 154(b) by 177 days.

(21) Appl. No.: 12/236,367

(22) Filed: Sep. 23, 2008

(65) Prior Publication Data

US 2009/0241297 A1 Oct. 1, 2009

Related U.S. Application Data

(62) Division of application No. 11/050,274, filed on Feb. 3, 2005, now Pat. No. 7,636,986.

(51) Int. Cl.
*F16G 11/04* (2006.01)
*F16G 11/10* (2006.01)

(52) U.S. Cl. ........ 24/130; 24/129 R; 24/129 A; 24/68 F; 24/71.1

(58) Field of Classification Search ............. D8/382, D8/356; 24/130
See application file for complete search history.

(56) References Cited

U.S. PATENT DOCUMENTS

| | | | |
|---|---|---|---|
| 555,340 A | 2/1896 | Schwarzmann | |
| 656,431 A | 8/1900 | Stewart | |
| 703,018 A | 6/1902 | Thomas | |
| RE12,147 E * | 8/1903 | Priddat | 24/130 |
| 904,747 A * | 11/1908 | Anderson | 24/130 |
| 1,205,496 A * | 11/1916 | Whitehead | 24/129 R |
| 1,322,410 A | 11/1919 | Connelly | |
| 1,565,041 A * | 12/1925 | Arney | 24/129 R |
| 2,536,159 A * | 1/1951 | Darkins | 24/130 |
| 3,398,714 A | 8/1968 | Wallin et al. | |
| 4,144,620 A | 3/1979 | Schaeffer | |
| 4,377,886 A | 3/1983 | Golden | |
| 4,719,668 A | 1/1988 | Cavanagh | |
| 4,828,210 A | 5/1989 | Anderson et al. | |
| 5,205,687 A | 4/1993 | Boyland | |
| 5,230,295 A | 7/1993 | Shell | |
| 5,307,751 A | 5/1994 | Shell | |
| 5,351,367 A | 10/1994 | Kennedy et al. | |
| 5,363,975 A | 11/1994 | Meade et al. | |
| 5,519,921 A | 5/1996 | Templer, Jr. | |
| 5,625,925 A * | 5/1997 | Richards | 24/129 B |
| 5,784,763 A | 7/1998 | Cassidy | |
| 5,813,790 A | 9/1998 | Goran, Jr. | |
| 6,317,935 B1 | 11/2001 | O'Rouke et al. | |
| 6,389,652 B1 * | 5/2002 | Williams | 24/130 |
| 6,662,739 B1 | 12/2003 | Radford et al. | |
| 2005/0061905 A1 | 3/2005 | Sherman et al. | |
| 2006/0168772 A1 | 8/2006 | Sorensen | |
| 2006/0179618 A1 | 8/2006 | Radford | |

FOREIGN PATENT DOCUMENTS

FR 2733013 A1 10/1996

* cited by examiner

*Primary Examiner* — Robert J Sandy
(74) *Attorney, Agent, or Firm* — Patton Boggs LLP

(57) ABSTRACT

A tensioning device includes a pair of opposing first surfaces defining a first wedge opening. The first surfaces are fixed relative to each other. The first wedge opening is shaped to releasably secure a first portion of a cord. A pair of opposing second surfaces defines a second wedge opening. The second surfaces are fixed relative to each other. The second wedge opening is spaced apart from the first wedge opening. The second wedge opening is shaped to releasably secure a second portion of the cord. A cord block defines a support surface spaced from the first and second wedge openings. The support surface is positioned to slidably support the cord between the first and second wedge openings.

13 Claims, 4 Drawing Sheets

SECTION A-A

SECTION B-B

TENSIONING DEVICE

CROSS-REFERENCE TO RELATED APPLICATIONS

This Application is a Division of U.S. patent application Ser. No. 11/050,274 filed on Feb. 3, 2005 now U.S. Pat. No. 7,636,986.

BACKGROUND OF THE INVENTION

The present invention relates to a tensioning device, a tensioning system, and methods of using the tensioning device. Ropes are often used to tie down loads, such as a tarp over a pickup truck bed. Ropes are also used to secure items, such as a tent to a stake. Often, it is difficult to get sufficient tension in the rope when simply tying it to a tie-down point. Therefore, it would be useful to have a device that is capable of tensioning a rope. There are many rope tensioning devices currently available. However, existing devices have drawbacks, including having complicated parts, being too expensive, or requiring knots to be tied.

BRIEF SUMMARY OF THE INVENTION

In one aspect, a tensioning device includes a pair of opposing first surfaces defining a first wedge opening. The first surfaces are fixed relative to each other. The first wedge opening is shaped to releasably secure a first portion of a cord. A pair of opposing second surfaces defines a second wedge opening. The second surfaces are fixed relative to each other. The second wedge opening is spaced apart from the first wedge opening. The second wedge opening is shaped to releasably secure a second portion of the cord. A cord block defines a support surface spaced from the first and second wedge openings. The support surface is positioned to slidably support the cord between the first and second wedge openings.

In another aspect, a tensioning system includes a cord and a tensioning device. The tensioning device includes a pair of opposing first surfaces defining a first wedge opening. The first surfaces are fixed relative to each other. A pair of opposing second surfaces defines a second wedge opening. The second surfaces are fixed relative to each other. The second wedge opening is spaced apart from the first wedge opening. A cord block defines a support surface spaced from the first and second wedge openings. A first portion of the cord is releasably secured in the first wedge opening and a second portion of the cord is releasably secured in the second wedge opening. A third portion of the cord between the first and second portions is sidably supported by the support surface of the cord block.

In another aspect, a method of tensioning a cord includes providing a tensioning device including a pair of opposing first surfaces defining a first wedge opening. The first surfaces are fixed relative to each other. A pair of opposing second surfaces defines a second wedge opening. The second surfaces are fixed relative to each other. The second wedge opening is spaced apart from the first wedge opening. A cord block defines a support surface spaced from the first and second wedge openings. A first portion of the cord is releasably secured in the first wedge opening. The cord is passed through a tie-down point. The cord is tensioned by sliding the cord on the support surface of the cord block. A second portion of the cord is releasably secured in the second wedge opening. The first and second portions of the cord are positioned on opposite sides of the tie-down point.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE INVENTION

Figure 1:
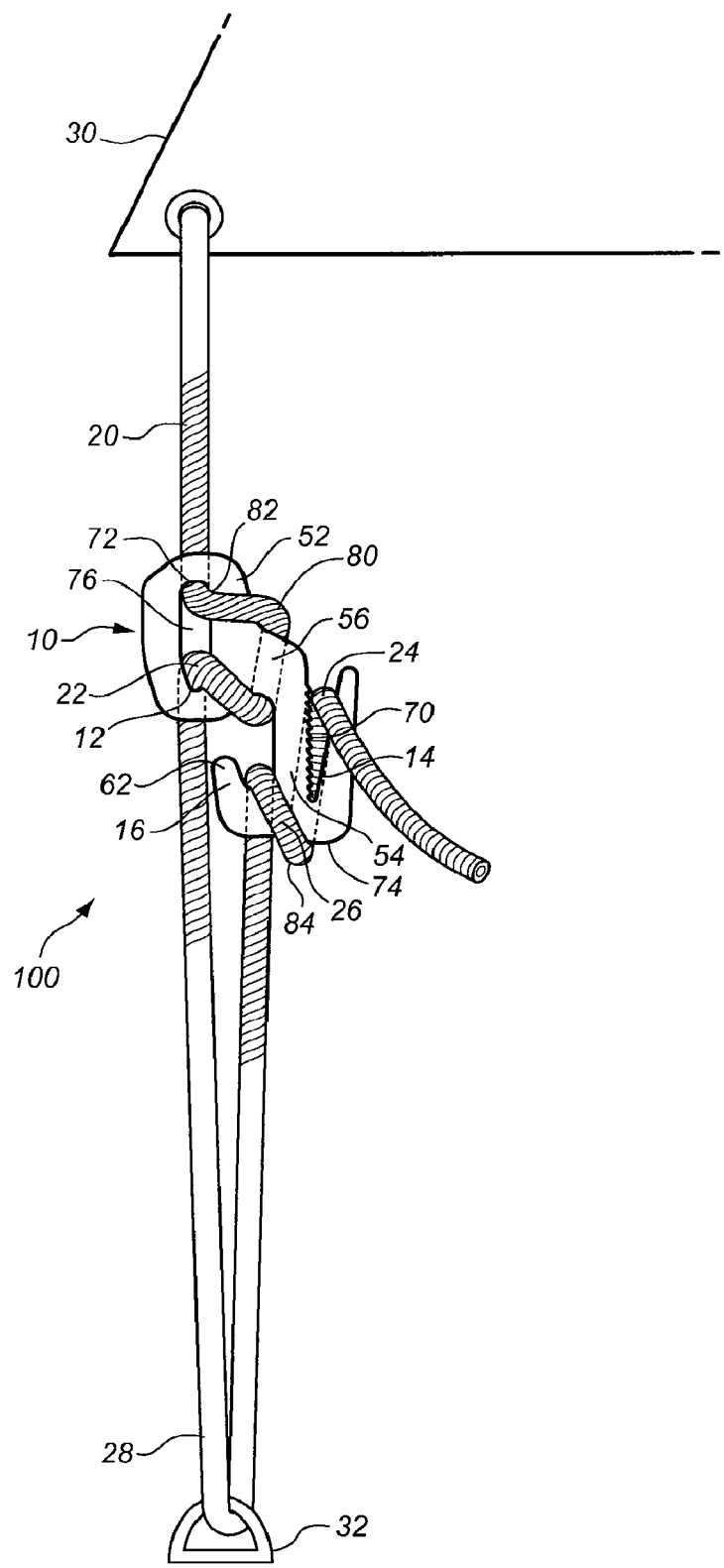
FIG. 1 shows one embodiment of a tensioning system.

The invention is described with reference to the drawings. The relationship and functioning of the various elements of this invention are better understood by the following detailed description. However, the embodiments of this invention as described below are by way of example only, and the invention is not limited to the embodiments illustrated in the drawings.

The invention provides a tensioning device for adjusting the tension on a piece of cord. The term "cord" as used herein, includes any type of elongated, relatively flexible object that can be used to secure an object, including without limitation ropes, straps, thread, yarn, wires, webs, twine, and fibers, whether circular, oval, flat, rectangular, or any other shape in cross-section.

An embodiment of the tensioning device 10 attached to a piece of cord 20 is shown in FIG. 1. The tensioning device 10 has a first wedge opening 12. One end of the cord 20 is attached to the object being secured, such as a portion of a tarp 30. A first portion 22 of cord is releasably secured in the first wedge opening 12. A portion 28 of cord passes through a tie-down point 32, which could be, for example, a bracket or a stake in the ground. The tensioning device 10 has a second wedge opening 14. A second portion 24 of cord is secured in the second wedge opening 14. Another portion 26 of cord between the tie-down point 32 and the second portion 24 of cord may be looped around a cord block 16. The term "block" as used herein means a member, or portion thereof, over or about which the cord passes when applying tension to the cord, and is not limited to any particular shape or material.

Figure 2:
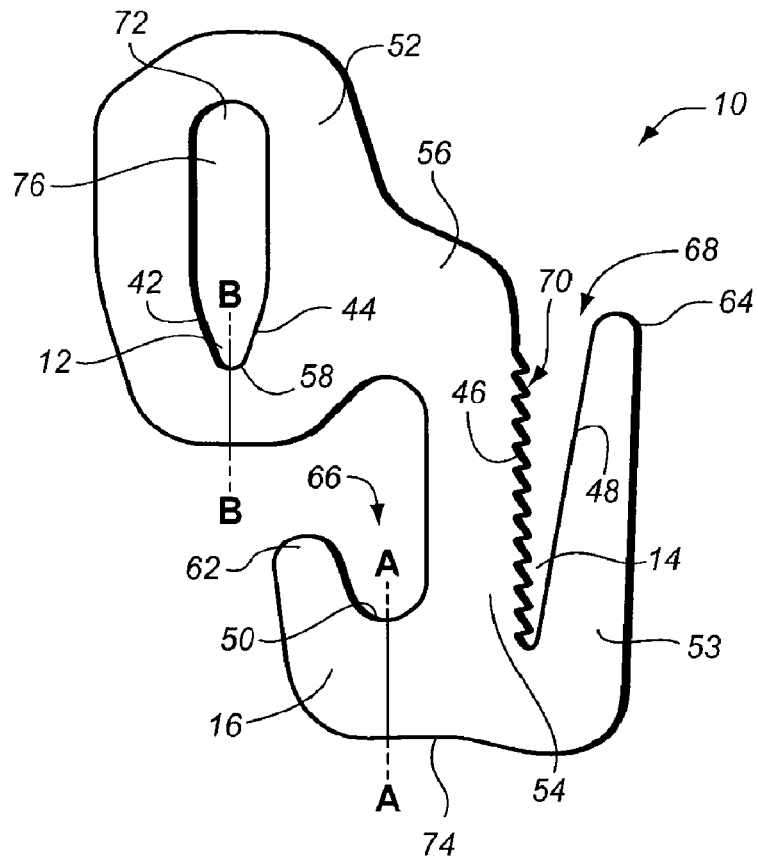
FIG. 2 shows one embodiment of the tensioning device of FIG. 1.

On embodiment of the tensioning device 10 is shown in FIG. 2. The tensioning device 10 may be constructed of any suitable material, including plastic, metal or wood. The tensioning device 10 includes a pair of opposing first surfaces 42, 44 defining the first wedge opening 12. The first surfaces 42, 44 are fixed relative to each other. The first wedge opening 12 is shaped to releasably secure a first portion 22 of cord. A pair of opposing second surfaces 46, 48 defines a second wedge opening 14. The first and second surfaces 46, 48 are fixed relative to each other. The second wedge opening 14 is spaced apart from the first wedge opening 12. The second wedge opening 14 is shaped to releasably secure a second portion of cord. The cord block 16 defines a support surface 50 spaced from the first and second wedge openings 12, 14. The support surface 50 is positioned to slidably support the cord between the first and second wedge openings 12, 14.

Figure 2A:
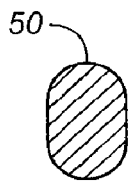
Figure 2B:
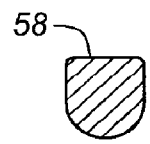

A cross section along line A-A of the tensioning divide 10 adjacent the second wedge opening 14 is shown in FIG. 2A. A cross section along line B-B of the tensioning device 10 adjacent the first wedge opening 12 is shown in FIG. 2B. In one embodiment, the maximum preferred radius of curvature of the cord block 16 across cross-section A-A is equal to half the thickness of the tensioning device 10 (i.e. the support surface 50 has a semicircular cross-section). This shape allows the cord to slide freely. In one embodiment, the surface 58 of the wedge opening 12 is generally flat across cross section B-B to provide the maximum gripping surface for the cord. In one embodiment, the tensioning device 10 has relatively thin cross-section. In one embodiment, the tensioning device 10 is between about 0.2 and about 0.5 inches thick. However, the tensioning device 10 may be less than 0.2 inches and greater than 0.5 inches.

In one embodiment, the tensioning device 10 includes a first body portion 52, a second body portion 54, and a neck portion 56. The first body portion 52 defines the first wedge opening 12 and the second body portion 54 defines the second wedge opening 14. The first and second body portions 52, 54 are joined by the neck portion 56. The neck portion 56 is adapted to support the cord between the first and second wedge openings 12, 14. The neck portion 56 allows the tensioning device 10 to attached to a piece of cord without untying the cord or having to tie the cord to the tensioning device 10. In one embodiment, the length of the neck portion 56 is narrower than one dimension of the first body portion 52 so as to provide a surface to support a loop of the cord around the neck portion 56. In one embodiment, the second body portion 54 further includes the cord block 16.

In one embodiment, the cord block 16 is defined by a first hook 62. The first hook 62 is disposed laterally from the second body portion 54 and extends towards, and defines an opening facing, the first body portion 52. The first hook 62 allows the cord to slide along the support surface 50 but limits lateral movement. In one embodiment, the second wedge opening 14 is defined by a second hook 64. In one embodiment, the second wedge opening 14 is generally V-shaped, with the second hook 64 tapering away from the second body portion 54. The second wedge opening 14 is adapted to secure a portion of cord between the second hook 64 and the second body portion 54. In one embodiment, the first and second hooks 62, 64 are disposed on opposite sides of the second body portion 54. In one embodiment, the first and second hooks 62, 64 have first and second mouths 66, 68 opening in the same general direction.

In one embodiment, one or both of the opposing second surfaces of the second wedge opening 14 has gripping members 70 formed thereon. The gripping members 70 may be any structure suitable for securing a cord between the second surfaces. In one embodiment, the gripping members 70 are teeth or barbs which are adapted to grip the cord. In one embodiment, the teeth are angled downwardly away from the mouth 68.

In one embodiment, the first body portion 52 includes a closed aperture 76 defined in part by the first wedge opening 12 and further defined in part by a support surface 72 opposite the first wedge opening 12. The support surface 72 is adapted to support a portion of cord. In one embodiment, the support surface 72 has a semicircular shape, and the first wedge opening 12 has a tapered shape. The closed aperture 76 is adapted to allow a loop 80 of cord to be inserted through the aperture 76, passed over the second body portion 54 and disposed around the neck of the tensioning device 10.

In one embodiment, the second body portion 54 includes a second support surface 74 formed on the second body portion 54 and facing a direction opposite the direction of the openings of the first and second mouths 66, 68. The second support surface 74 is adapted to slidably support a portion of cord. In one embodiment, the second support surface 74 is generally flat or slightly indented. However, the second support surface 74 may have a more elaborate structure, such as a concave portion adapted to support the cord, similar to the support surface 50 on the cord block 16.

Referring to FIG. 1, a tensioning system is shown. The tensioning system includes a cord 20 and the tensioning device 10. A first portion 22 of the cord is releasably secured in the first wedge opening 12 and a second portion 24 of the cord is releasably secured in the second wedge opening 14. A third portion 26 of the cord between the first and second portions is slidably supported by the support surface of the cord block 16.

In one embodiment, the tensioning system includes a tie-down point 32 spaced from the body, wherein a fourth portion 28 of the cord passes through the tie-down point 32 between the first wedge opening 12 and the support surface 50 of the cord block 16. It should be understood that the tie-down point is not necessarily a single point. For example, the tensioning device may be used to secure a box to a push cart. A piece of cord is attached to the top of the cart and runs around the bottom of the box. The tensioning device is secured to the portion of cord near the top of the cart. In this case, the tie-down is not a single point but rather the bottom surface of the box. Further variations of the tie-down configuration are possible.

In one embodiment, the tensioning system includes a loop portion 80 of the cord disposed around the neck portion 56. In one embodiment, a portion 82 of the cord is supported by the second support surface 72 opposite the first wedge opening 12. Thus, the cord is supported by the support surface 72, loops around the neck portion 56, and is secured in the first wedge opening 12.

In one embodiment, a portion 84 of the cord between the second and third portions 24, 26 of the cord is slidably supported by the third support surface 74 on the second body portion 54. In one embodiment, the first hook 62 helps to restrain or prevent the cord from moving off of the cord block 16. In one embodiment, the second portion 24 of the cord is releasably secured in the second wedge opening 14 by gripping members 70. The gripping members 70 push against the surface of the cord to help secure it within the second wedge opening 14.

Figure 3:
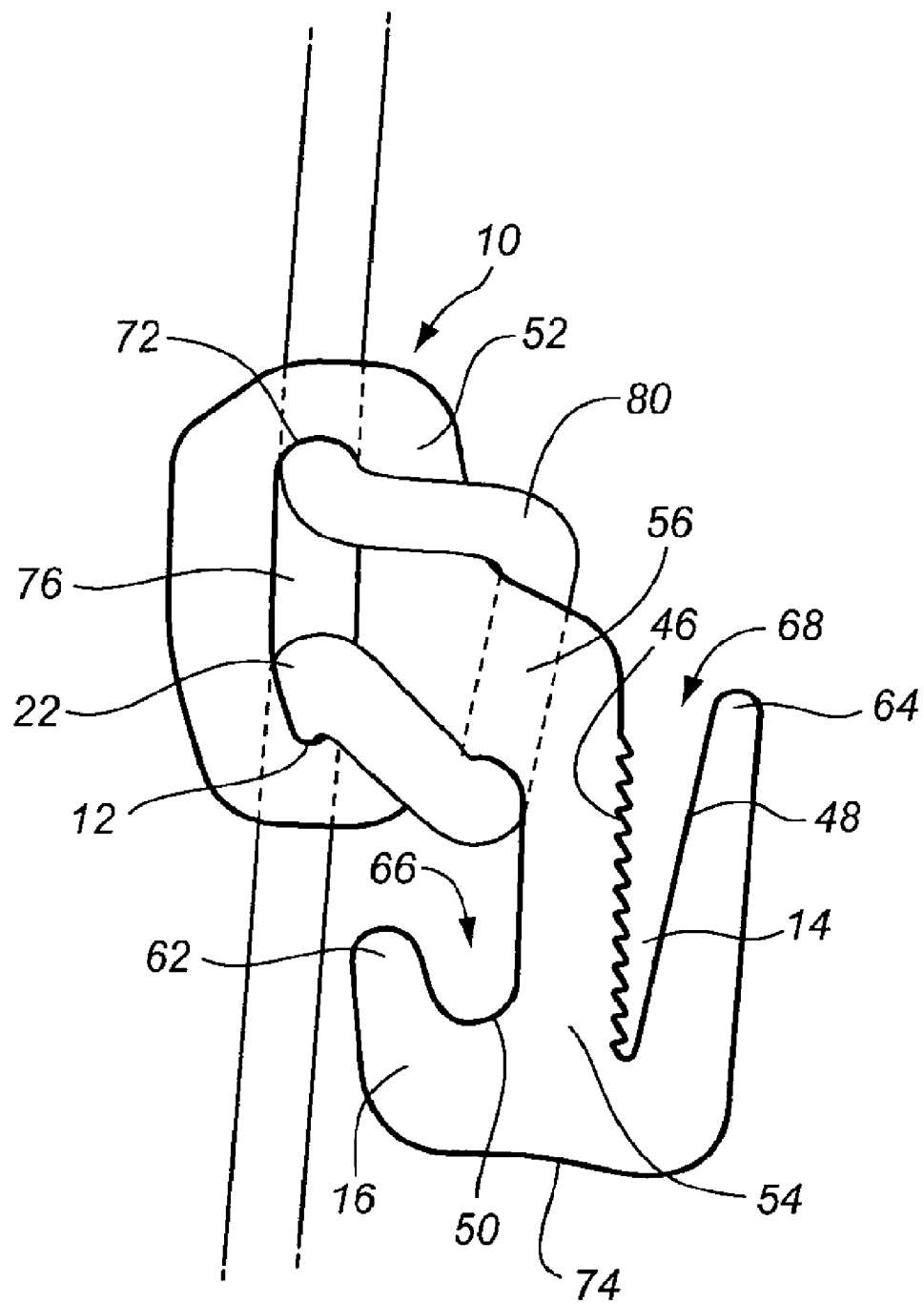
FIG. 3 shows a step in one embodiment of a method of tensioning a cord.

In operation, as explained above, a first portion 22 of the cord is releasably secured in the first wedge opening 12, as shown in FIG. 3. In one embodiment, the method of tensioning the cord further includes disposing a loop portion 80 of the cord around the neck portion 56. This allows the tensioning device 10 to be secured to the cord without the need either to untie the cord from its existing location or to tie the cord to the tensioning device 10 itself. The position of the tensioning device 10 on the cord can also be easily adjusted by moving a portion of the cord away from the first wedging surfaces or releasing it from the first wedge opening 12 and then sliding the tensioning device 10 along the cord as the cord slides along the neck 56 and surface 72. In one embodiment, the loop portion 80 of the cord is inserted through the aperture 76 prior to disposing the loop portion 80 around the neck, and is then passed over the second body portion 54, with a portion of the cord supported by the second support surface 72.

Figure 4:
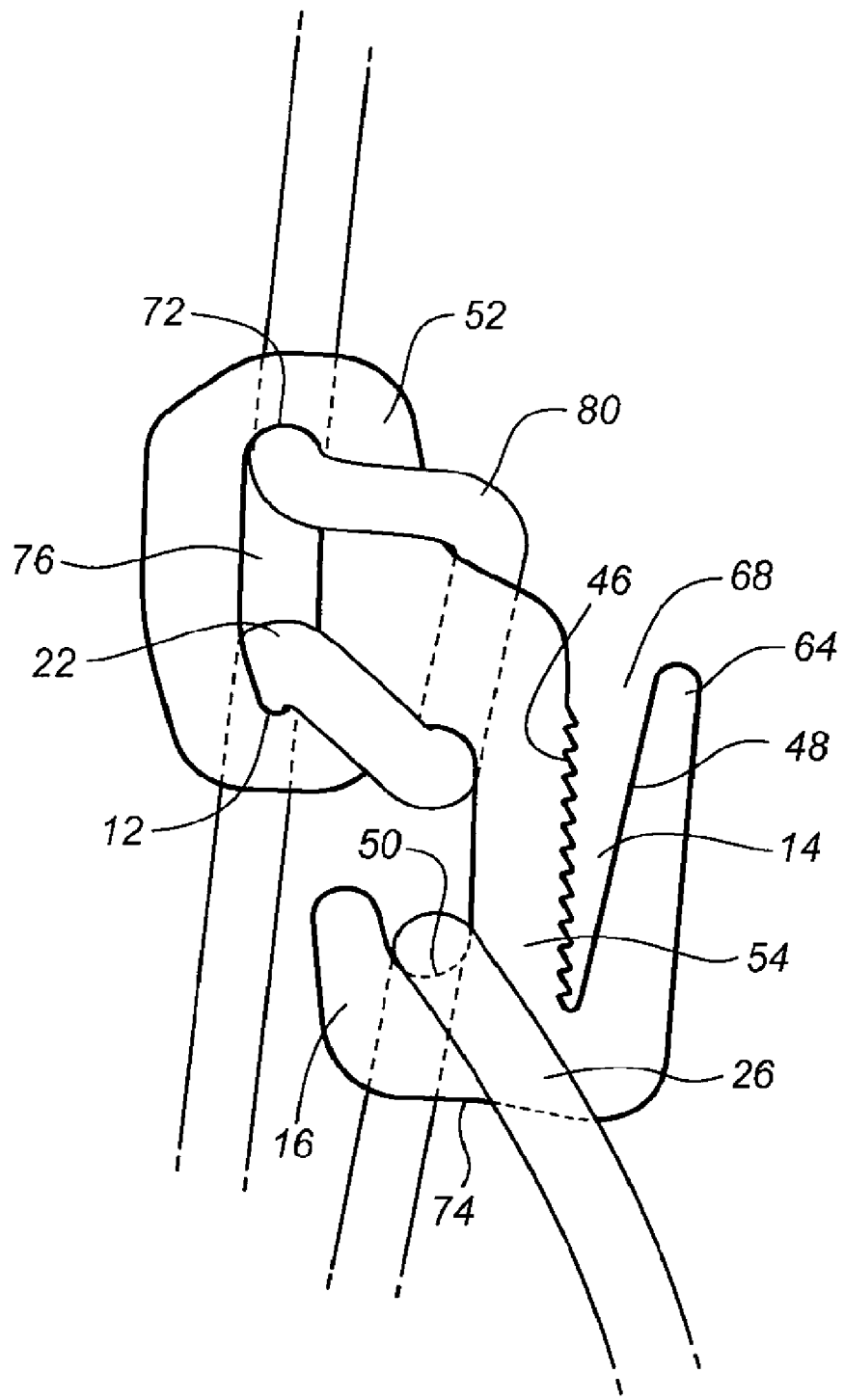
FIG. 4 shows another step in one embodiment of a method of tensioning a cord.

The cord is then passed through a tie-down point 32. In one embodiment, the user pulls the cord tight and engages a portion 24 in the wedge opening 14 between the wedge surfaces 42, 44. Alternatively, the cord is tensioned by pulling on the portion 26 of cord to slide the cord on the support surface 50 of the cord block 16, as shown in FIG. 4. In this aspect, the system functions as a block and tackle, with the cord allowing a 2:1 mechanical advantage. Thus, less strength is required to reach a given tension that would be otherwise required without the tensioning device 10.

A second portion 24 of cord is then releasably secured in the second wedge opening 14, with the first and second portions 22, 24 of the cord positioned on opposite sides of the tie-down point 32, as shown in FIG. 1. In one embodiment, the method further includes wrapping the cord around the cord block 16 and supporting the cord on the third support surface 74 on the second body portion 54. In one embodiment, the gripping members 70 push against the second portion 24 of cord to help to secure it within the second wedge opening 14.

In a further embodiment, a portion of the cord may be disposed through the tie-down point 32 a second time after passing over the cord block 16. Thus, the cord travels from the tensioning device 10 to a tie-down point 32, from the tie-down point 32 to the cord block 16, from the cord block 16 back again to the tie-down point 32, and then from the tie-down point 32 to the user. This configuration creates a 4:1 mechanical advantage for the user pulling on the end of the cord, to allow even greater tensioning of the cord. After the cord is tensioned, the portion 24 of the cord is engaged in the wedge opening 14 between the wedge surfaces 46, 48.

Although the embodiments of the tensioning device are shown as discrete pats, it will be apparent that the tensioning device may be incorporated into other devices or pieces of equipment.

The embodiments described above and shown herein are illustrative and not restrictive. The scope of the invention is indicated by the claims rather than by the foregoing description and attached drawings. The invention may be embodied in other specific forms without departing from the spirit of the invention. Accordingly, these and any other changes which come within the scope of the claims are intended to be embraced therein.

What is claimed as new and desired to be protected by Letters Patent of the United States is:

1. A tensioning device comprising:
   a pair of opposing first surfaces defining a first wedge opening, wherein the first surfaces are fixed relative to each other, wherein the first wedge opening is shaped to releasably secure a first portion of a cord;
   a pair of opposing second surfaces defining a second wedge opening, wherein the second surfaces are fixed relative to each other, wherein the second wedge opening is spaced apart from the first wedge opening, and wherein the second wedge opening is shaped to releasably secure a second portion of the cord; and
   a cord block defining a support surface spaced from the first and second wedge openings, wherein the support surface is positioned to slidably support the cord between the first and second wedge openings;
   a first body portion defining the first wedge opening and a second body portion defining the second wedge opening, wherein the first and second body portions are joined by a neck portion adapted to support the cord between the first and second wedge openings, wherein the support surface comprises a first support surface, and wherein the first body portion has a closed aperture defined in part by the first wedge opening and further defined in part by a second support surface opposite the first wedge opening, the second support surface adapted to support the cord.

2. The tensioning device of claim 1 wherein the cord block is formed as a hook.

3. The tensioning device of claim 1 wherein the second body portion further comprises the cord block.

4. The tensioning device of claim 3 wherein the cord block is defined by a first hook and the second wedge opening is defined by a second hook.

5. The tensioning device of claim 4 wherein the first and second hooks are disposed on opposite sides of the second body portion.

6. The tensioning device of claim 5 wherein the first and second hooks have first and second mouths opening in the same direction.

7. The tensioning device of claim 6 wherein the support surface comprises a first support surface and wherein the second body portion further comprises a second support surface formed on the second body portion and facing a direction opposite the direction of the opening of the first and second mouths.

8. The tensioning device of claim 1 wherein one or both of the opposing second surfaces has gripping members formed thereon.

9. A tensioning system comprising:
   a cord; and
   a tensioning device comprising:
     a pair of opposing first surfaces defining a first wedge opening, wherein the first surfaces are fixed relative to each other;
     a pair of opposing second surfaces defining a second wedge opening, wherein the second surfaces are fixed relative to each other, wherein the second wedge opening is spaced apart from the first wedge opening; and
     a cord block defining a support surface spaced from the first and second wedge openings;
   wherein a first portion of the cord is releasably secured in the first wedge opening and a second portion of the cord is releasably secured in the second wedge opening, and wherein a third portion of the cord between the first and second portions is slidably supported by the support surface of the cord block; and
   a first body portion defining the first wedge opening and a second body portion defining the second wedge opening, wherein the first and second body portions are joined by a neck portion, wherein a loop portion of the cord is disposed around neck portion, wherein the support surface comprises a first support surface and wherein the first body portion has a closed aperture defined in part by the first wedge opening and further defined in part by a second support surface opposite the first wedge opening, wherein a fourth portion of the cord is supported by the second support surface.

10. The tensioning system of claim 9 further comprising a tie-down point spaced from the body, wherein a fourth portion of the cord passes through the tie-down point between the first wedge and the support surface of the cord block.

11. The tensioning system claim 9 wherein the cord block is formed on the second block portion and is defined by a first hook and the second wedge opening is defined by a second hook, wherein the first and second hooks have first and second mouths opening in the same direction, and wherein the second body portion further comprises a third support surface formed on the second body portion and facing a direction opposite the direction of the opening of the first and second mouths, wherein a sixth portion of the cord between the second and third portions of the cord is slidably supported by the third support surface.

12. The tensioning system of claim 11 wherein the first and second hooks are disposed on opposite sides of the second body portion.

13. A tensioning device comprising:
a pair of opposing first surfaces defining a first wedge opening, wherein the first surfaces are fixed relative to each other, wherein the first wedge opening is shaped to releasably secure a first portion of a cord;
a pair of opposing second surfaces defining a second wedge opening, wherein the second surfaces are fixed relative to each other, wherein the second wedge opening is spaced apart from the first wedge opening, and wherein the second wedge opening is shaped to releasably secure a second portion of the cord;
a cord block defining a support surface spaced apart from the first and second wedge openings, wherein the support surface is positioned to slidably support the cord between the first and second wedge openings; and
a first body portion defining the first wedge opening and a second body portion defining the second wedge opening, wherein the first and second body portions are joined by a neck portion adapted to support the cord between the first and second wedge openings, wherein the support surface comprises a first support surface, and wherein the first body portion has a closed aperture defined in part by the first wedge opening and further defined in part by a second support surface opposite the first wedge opening, the second support surface adapted to support the cord.

* * * * *